United States Patent
Sheldon et al.

(10) Patent No.: US 6,179,429 B1
(45) Date of Patent: Jan. 30, 2001

(54) ILLUMINATED INSTRUMENT CLUSTER DIAL FOR AN AUTOMOTIVE VEHICLE

(75) Inventors: Daniel Frank Sheldon, Northville; Sergey Kalashnikov, West Bloomfield, both of MI (US)

(73) Assignee: Visteon Global Technologies, Inc., Dearborn, MI (US)

( * ) Notice: Under 35 U.S.C. 154(b), the term of this patent shall be extended for 0 days.

(21) Appl. No.: 09/058,975

(22) Filed: Apr. 13, 1998

(51) Int. Cl.⁷ .................................................. G01D 11/28
(52) U.S. Cl. ................... 362/26; 362/27; 362/23; 362/31; 362/489; 362/482; 362/511; 362/543
(58) Field of Search .................. 362/27, 31, 32, 362/26, 80, 23, 242, 489, 482, 511, 543; 116/280; 428/155, 13

(56) References Cited

U.S. PATENT DOCUMENTS

| | | | |
|---|---|---|---|
| 2,805,505 | 9/1957 | Hardesty | 40/546 |
| 2,831,453 | 4/1958 | Hardesty | 116/288 |
| 2,848,830 | 8/1958 | Dmitriev et al. | 40/546 |
| 3,143,098 | 8/1964 | Blackwell | 116/288 |
| 4,233,927 | 11/1980 | Oikawa et al. | 116/287 |
| 4,258,317 | 3/1981 | Dubauskas | 324/114 |
| 4,323,951 | 4/1982 | Pasco | 362/27 |
| 4,404,522 | 9/1983 | Pucciarello | 324/114 |
| 4,415,855 | 11/1983 | Dubauskas | 324/114 |
| 4,447,860 | 5/1984 | Stone et al. | 362/30 |
| 4,449,024 | 5/1984 | Stracener | 200/317 |
| 4,714,983 | 12/1987 | Lang | 362/27 |
| 4,882,659 | 11/1989 | Gloudemans | 362/511 |
| 4,884,058 | 11/1989 | Ikeda | 340/461 |
| 5,003,433 | 3/1991 | Fournier | 362/29 |
| 5,142,456 | 8/1992 | Murphy | 362/26 |
| 5,436,038 | * 7/1995 | Gelb | 428/13 |
| 5,458,082 | 10/1995 | Cookingham | 116/288 |
| 5,556,187 | * 9/1996 | Furaya et al. | 362/27 |
| 5,578,985 | 11/1996 | Cremers et al. | 340/461 |
| 5,678,912 | 10/1997 | Ayres et al. | 362/23 |

FOREIGN PATENT DOCUMENTS

| 0 602 385 | 11/1993 | (EP) . |
|---|---|---|
| 1077802 | 8/1997 | (GB) . |

* cited by examiner

Primary Examiner—Sandra O'Shea
Assistant Examiner—Ismael Negron
(74) Attorney, Agent, or Firm—Leslie C. Hodges

(57) ABSTRACT

An automotive vehicle illumination mechanism for an instrument cluster dial includes a transparent light guide having a generally planar front surface, at least one semi-circular light socket, and at least one dial socket, a light source arranged within the light socket for directing light into the light guide, a lens having a focal axis arranged adjacent the light source and within the light socket for collecting the light from the light source and transmitting the light with a predetermined spread angle toward the dial socket, and a plurality of reflective surfaces, distributed in a fan-like arrangement about the focal axis and intermediate the lens and the dial socket, for redirecting light received from the lens toward the dial.

17 Claims, 2 Drawing Sheets

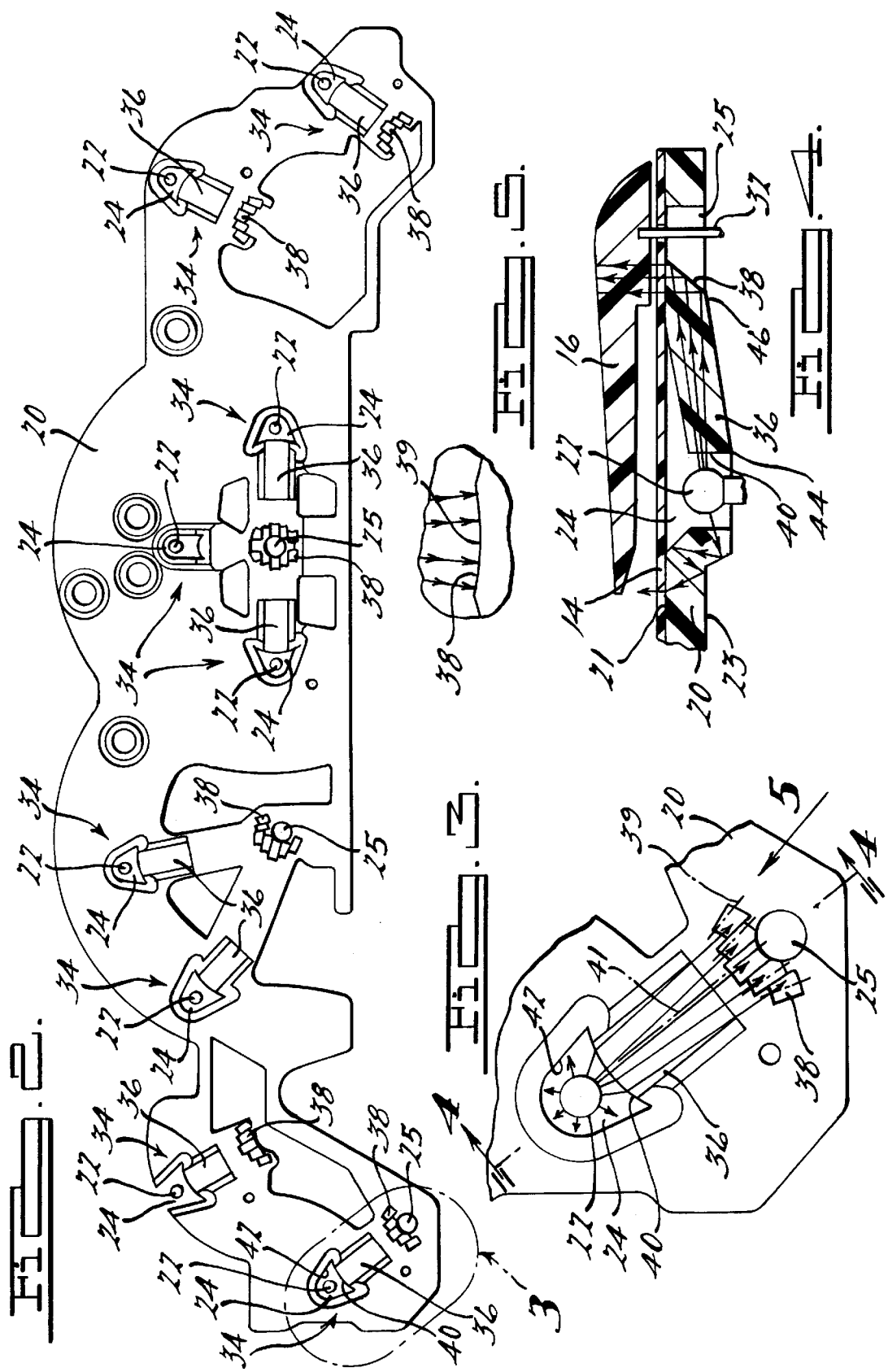

ILLUMINATED INSTRUMENT CLUSTER DIAL FOR AN AUTOMOTIVE VEHICLE

FIELD OF THE INVENTION

The present invention relates to automotive instrument cluster dials, and more specifically, to illumination of such dials.

BACKGROUND OF THE INVENTION

Conventional instrument cluster dials are illuminated by incorporating a small lamp on the dial or by using light conducting transparent pointer material optically coupled to a near-by light source. In the case of the small lamp on the dial, it is expensive to provide a lamp that is sufficiently small and yet sufficiently bright to illuminate the dial.

In the case of the light conduction method for dial illumination, it is the usual practice to transmit light from a remote lamp through a transparent light guide and into the dial. Problematically, illumination in such a manner requires many reflections before reaching the dial and only a small portion of the source light is eventually received by the dial, thereby resulting in a dimly lit dial. Further, a single, cone shaped reflective surface is used to couple the light into the dial. A single reflective surface has a limited usable reflective surface area with which to couple light into the dial. The limited surface area in conjunction with the small portion of light being received thereby only amplifies the dimly lit dial problem.

Recent automotive designs have necessitated reducing the packaging space or depth of the instrument cluster. Reducing the cluster depth has necessitated the use of smaller, lower power lamps for back lighting the cluster and illuminating the dial. These small lamps are less bright than the larger lamps used with the previous thicker clusters, which only amplifies the dimly lit dial problem described above.

One way to remedy the lower power lamp problem is to simply add additional lamps to brighten the dial. This solution, however, adds complexity and cost to the instrument cluster.

What is desired, therefore, is a mechanism to sufficiently illuminate an instrument cluster dial, which uses a minimum number of low power lamps, thereby minimizing cost and complexity.

SUMMARY OF THE INVENTION

Responsive to the deficiencies in the prior art, the present invention provides an automotive vehicle illumination mechanism for an instrument cluster dial, including a transparent light guide having a generally planar front surface, at least one semi-circular light socket, and at least one dial socket. A light source is arranged within the light socket for directing light into the light guide. A lens having a focal axis is arranged adjacent the light source and within the light socket for collecting the light from the light source and transmitting the light with a predetermined spread angle toward the dial socket. Finally, a plurality of reflective surfaces, distributed in a fan-like arrangement about the focal axis and intermediate the lens and the dial socket, redirect light received from the lens toward the dial.

In a preferred embodiment of the present invention, the plurality of reflective surfaces have generally curvilinear cross sections, which are concave with respect to the lens.

An object of the present invention is to sufficiently illuminate an instrument cluster dial with a minimum number of low power lamps.

An advantage of the present invention is the utilization of a plurality of reflective curvilinear surfaces to direct light into the dial. The plurality of reflective surfaces, distributed in a fan-like arrangement about the focal axis of the lens, function to reflect substantially more light into the dial than conventional single reflector mechanisms, thereby sufficiently illuminating the dial even though low power lamps are used.

BRIEF DESCRIPTION OF THE DRAWINGS

Other features and advantages of the present invention will become apparent to those skilled in the automotive vehicle lighting arts upon reading the following description with reference to the accompanying drawings, in which:

FIG. 2 is a front view of an automotive vehicle instrument cluster light guide according to the present invention;

FIG. 3 is a magnified view of the circled portion 3 of FIG. 2 of a dial illuminator according to the present invention;

FIG. 4 is a cross-sectional view taken along the line 4—4 of FIG. 3 of a dial illuminator according to the present invention; and FIG. 5 is an axial view taken in the direction of arrow 5 of FIG. 3 of an individual reflective surface according to the present invention.

DETAILED DESCRIPTION OF THE PREFERRED EMBODIMENT

Figure 1:
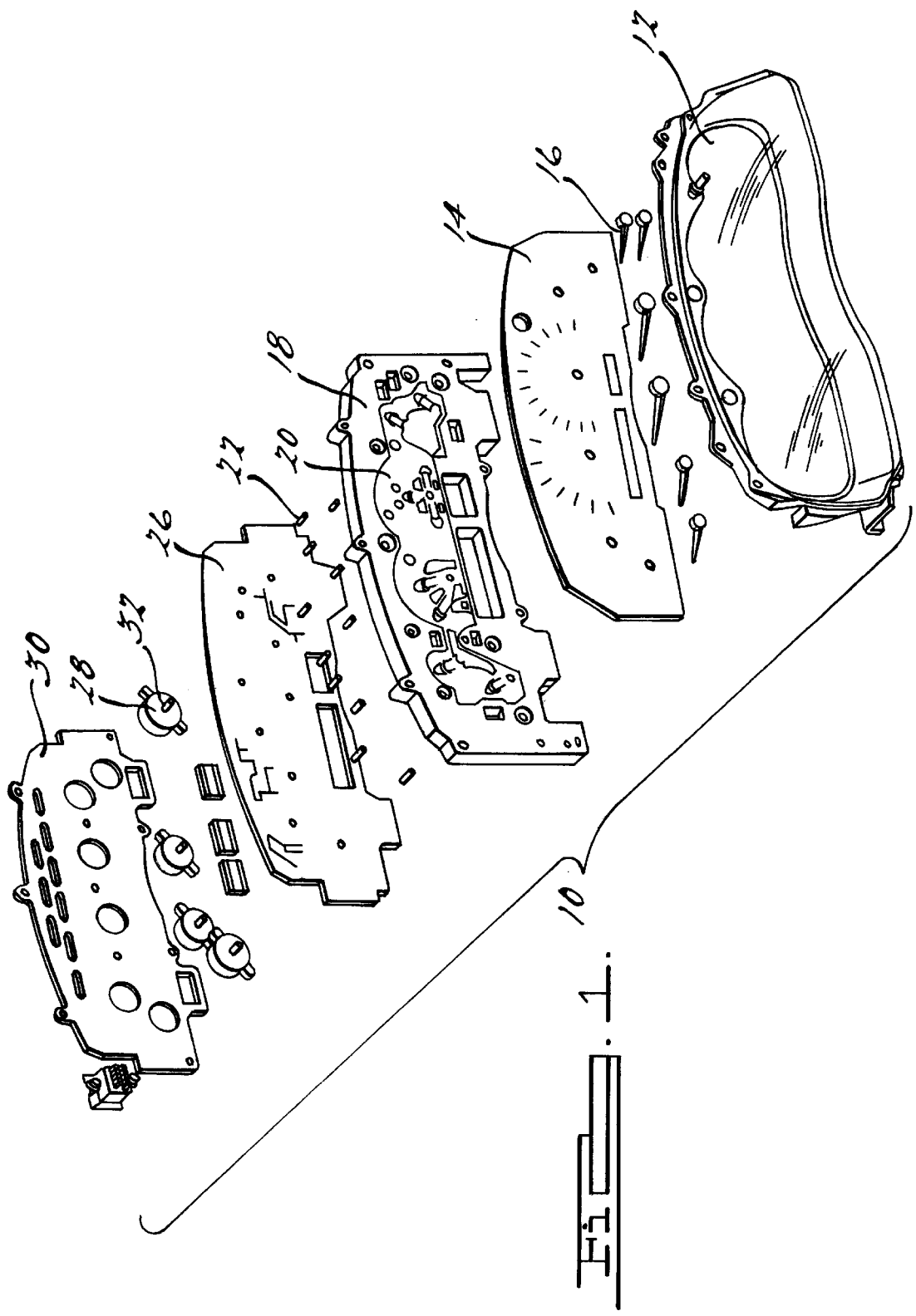
FIG. 1 is a perspective, exploded view of an automotive vehicle instrument cluster according to the present invention.

Turning now to the drawings, and in particular to FIG. 1 thereof, an automotive vehicle instrument cluster 10 is shown. The cluster 10 has a generally transparent lens or mask 12 adapted to overlay a one-piece graphics appliqué 14. The graphics appliqué 14 has markings imprinted thereon for communicating information relative to various vehicle operational states. Exemplary of such are markings for a tachometer, a speedometer, and a fuel gauge. A plurality of dials 16 are rotationally disposed proximate to the markings to facilitate communicating such information. The graphics appliqué 14 is adapted to overlay a substantially opaque structural support member 18. Received within the support member 18 is a light transmissive light guide 20. As shown most clearly in FIG. 2, the light guide 20 is adapted to receive a plurality of low power lamps 22 within a plurality of light sockets 24, each lamp 22 having a corresponding light socket 24. The light guide 20 further has a plurality of dial sockets 25, as also shown in FIG. 2. The lamps 22 are mounted on a printed circuit board 26 and are received by the light guide 20, within the light sockets 24, upon overlaying the support member 18 thereon. A plurality of low profile gauges 28, mounted on a backing 30, have rotatable dial posts 32. The dial posts 32 project through the circuit board 26, are received within the dial sockets 25, and project through the appliqué 14, as best shown in FIG. 4, upon overlaying the circuit board 26 upon the backing 30. The dial posts 32 are adapted to have the dials 16 rotatably mounted thereon, as shown in FIG. 4.

With reference to FIG. 2, the light guide 20 has a plurality of dial illuminators 34. Each dial illuminator 34 has a light socket 24, a light transmitting portion 36, a plurality of reflective surfaces or facets 38, and a dial socket 25. As shown in FIG. 4, the light guide 20 has a substantially planar front surface 21 adapted to receive the appliqué 14. The guide 20 preferably has a frosted back surface 23, opposite the front surface 21, to facilitate reflecting light out of the guide 20 and through the front surface 21, as shown in FIG. 4.

As shown in FIGS. 2 and 3, the light socket 24 is generally mushroom cap shaped with a light receiving surface 42 and a light collecting lens 40, which has a focal axis 41 and is concave with respect to the dial socket 25. The lamp 22 is situated within the light socket 24 to emit light incident upon the light receiving surface 42 and the light collecting lens 40. The light receiving surface 42 of the mushroom cap shaped light socket 24 functions to collect and transmit light throughout the light guide 20 for general back lighting purposes. More specifically, to illuminate the various markings on the appliqué 14. The light emitted by the lamp 22 and received by the lens 40 has an initial spread angle. The lens 40 functions to collect and modify the initial spread angle of light into a new, predetermined spread angle, and direct the light along the light transmitting portion 36 in the direction of the reflective surfaces 38, as shown in FIG. 3.

As further shown in FIG. 3, the light transmitting portion 36 is situated intermediate the lens 40 and the reflective surfaces 38. The transmitting portion 36 is adapted to transmit light via total internal reflection along the portion 36 length and in the direction of the reflective surfaces 38. Total internal reflection of light occurs when an incident angle $\Pi$ of light upon a surface exceeds a critical angle $\Pi_c$ given by the equation $\Pi_c = \sin^{-1}(n_1/n_2)$ wherein $n_1$ is the index of refraction of air and $n_2$ is the index of refraction of plastic. As shown in FIG. 4, the transmitting portion 36 ramps from a first end 44, adjacent the lamp 22, up to a second end 46 where the front surface 21 contacts the appliqué 14 and the second end 46 transitions into the reflective surfaces 38.

As shown in FIG. 3, a light deflection mechanism in the form of a plurality of reflective surfaces 38 is disposed intermediate the dial socket 25 and the light transmitting portion 36. The reflective surfaces 38 are angled a predetermined degree with respect to the front surface 21. Each individual reflective surface 38 has a longitudinal axis 39, a curvilinear cross-section, and is concave with respect to the lens 40. The reflective surfaces 38 may be either semi-cylindrical or semi-conical without departing from the scope of the present invention.

As shown in FIG. 5, the curvilinear cross-section of the reflective surface 38 is preferably curved with respect to the predetermined spread angle of light received from the lens 40. More specifically, the cross-section is curved in such a fashion so that all light rays strike the reflective surface 38 substantially perpendicularly at all points across the cross-section, as further shown in FIG. 5. This relationship is advantageous because the light striking each point across the cross-section will be reflected at an angle substantially perpendicular to the front surface 21 and in the direction of the dial 16.

As shown in FIG. 3, each longitudinal axis 39 of each reflective surface 38 is angled a predetermined degree with respect to the focal axis 41 of the lens 40. The predetermined degree progressively increases a predetermined amount the greater the distance the reflective surface 38 is from the focal axis 41. In other words, the reflective surfaces 38 are disposed about the focal axis 41 in a fan-like arrangement. The fan-like arrangement is advantageous in that substantially more light is captured from the lamp 22 and directed toward the dial 16 than in conventional mechanisms.

Only one embodiment of the vehicle instrument cluster dial illuminator of the present invention has been described. Those skilled in the automotive lighting arts will appreciate that others may be possible without departing from the scope of the following claims.

We claim:

1. An automotive vehicle instrument cluster, comprising:
   a transparent light guide having a generally planar front surface, at least one light socket, and at least one dial socket, the light socket and the dial socket each having an axis generally normal to said generally planar front surface;
   a dial support means received in the dial socket for rotation about the dial socket axis;
   a transparent dial mounted on the support means for rotational movement therewith;
   a light source arranged within the light socket for directing light into the light guide; and
   means for directing light received from the light source to the light receiving surface of the dial, including:
      a lens arranged adjacent the light source and within the light from the light source and transmitting the light with a predetermined spread angle toward the dial socket; and
      a plurality of deflection means intermediate the lens and the dial socket, each of the deflection means having a reflective surface and a longitudinal axis, each reflective surface angled a predetermined degree with respect to said generally planar front surface and angled a predetermined degree with respect to each other reflective surface longitudinal axis, for redirecting the light received from the lens to the dial;
   wherein the light socket is a concavo-convex light socket wherein the convex portion functions as the lens.

2. An instrument cluster dial according to claim 1, wherein each deflection means reflective surface has a curvilinear cross section perpendicular to the reflective surface longitudinal axis.

3. An instrument cluster dial according to claim 1, wherein the lens has a focal axis and the plurality of deflection means are distributed about the focal axis in a fan-like arrangement.

4. An instrument cluster dial according to claim 1, wherein the deflection means are a plurality of semi-cylindrical reflective surfaces.

5. An instrument cluster dial according to claim 4, wherein the plurality of semi-cylindrical reflective surfaces are concave with respect to the lens.

6. An instrument cluster dial according to claim 1, wherein the deflection means are a plurality of semi-conical reflective surfaces.

7. An instrument cluster dial according to claim 2, wherein each curvilinear cross section is concave with respect to the lens.

8. An instrument cluster dial according to claim 6, wherein the plurality of semi-conical reflective surfaces are concave with respect to the lens.

9. An automotive vehicle illumination mechanism for an instrument cluster dial, comprising;
   a transparent light guide having a generally planar front surface, at least one semi-circular light socket, and at least one dial socket, the light socket and the dial socket each having an axis generally normal to said generally planar front surface;
   a light source arranged within the light socket for directing light into the light guide;
   a lens having a focal axis arranged adjacent the light source and within the light socket for collecting the light from the light source and transmitting the light with a predetermined spread angle toward the dial socket; and a plurality of reflective surfaces intermediate the lens and the dial socket, the plurality of reflective surfaces distributed in a fan-like arrangement about the focal axis, for redirecting light received from the lens in a direction parallel to the dial socket axis and toward the dial socket;

wherein the light socket is a concavo-convex light socket wherein the convex portion functions as the lens.

10. An instrument cluster dial according to claim 9, wherein each reflective surface has a curvilinear cross section and is concave with respect to the lens.

11. An instrument cluster dial according to claim 9, wherein the reflective surfaces are semi-cylindrical reflective surfaces, which are concave with respect to the lens.

12. An instrument cluster dial according to claim 9, wherein the reflective surfaces are semi-conical reflective surfaces, which are concave with respect to the lens.

13. An automotive vehicle instrument cluster dial according to claim 9, wherein the light socket is a concavo-convex light socket wherein the convex portion functions as the lens.

14. An automotive vehicle instrument cluster light guide having a generally planar front surface, comprising:

at least one semi-circular light socket having an axis generally normal to said generally planar front surface, the light socket adapted to receive light from a light source;

at least one dial socket having an axis generally normal to the front surface;

a lens having a focal axis arranged adjacent the semi-circular light socket and intermediate the light socket and the dial socket, the lens adapted to collect light from a light source and transmit light with a predetermined spread angle toward the dial socket; and a plurality of reflective surfaces having a curvilinear cross-section and intermediate the lens and the dial socket, the plurality of reflective surfaces distributed in a fan-like arrangement about the focal axis and oriented in concave fashion with respect to the lens, for redirecting light received from the lens in a direction parallel to the dial socket axis;

wherein the light socket is a concavo-convex light socket wherein the convex portion functions as the lens.

15. An instrument cluster light guide according to claim 14, wherein the curvilinear reflective surfaces are semi-cylindrical reflective surfaces, which are concave with respect to the lens.

16. An instrument cluster light guide according to claim 14, wherein the curvilinear reflective surfaces are semi-conical reflective surfaces, which are concave with respect to the lens.

17. An instrument cluster light guide according to claim 14, wherein the light guide further has a frosted back surface opposite the front surface.

* * * * *